Feb. 11, 1936.     O. W. HOSKING     2,030,593
AUTOMATIC TIRE INFLATER
Filed May 9, 1935     2 Sheets-Sheet 1

INVENTOR.
OAKLEY W. HOSKING
Kwis, Hudson & Kent
ATTORNEYS.

Feb. 11, 1936.     O. W. HOSKING     2,030,593
AUTOMATIC TIRE INFLATER
Filed May 9, 1935     2 Sheets-Sheet 2

INVENTOR.
OAKLEY W. HOSKING
BY
Kwis Hudson & Kent
ATTORNEYS.

Patented Feb. 11, 1936

2,030,593

UNITED STATES PATENT OFFICE 2,030,593

AUTOMATIC TIRE INFLATER

Oakley W. Hosking, Monroe, N. Y.

Application May 9, 1935, Serial No. 20,624

5 Claims. (Cl. 152—11)

The present invention relates to pneumatic vehicle tires and more particularly to a pneumatic tire inflater adapted to be operated by the flexure of the tire tread, as the vehicle passes over the road surface, to maintain the air pressure therein.

An object of the invention is the provision of a novel tire inflater adapted to be automatically operated as the tire travels along a road surface to maintain the air pressure therein, which will be positive and reliable in operation, simple and rigid in construction, and readily installed and maintained.

Another object of the invention is the provision of a novel reciprocating type inflater for pneumatic tires, adapted to be permanently installed with the tire, the piston of which is operatively connected to the outer part of the inner tube or casing, in which all necessary adjustments can be made from the outside thereof without dismantling the tire assembly.

The invention resides in certain novel features and details of construction, and combination and arrangement of parts, and further objects and advantages thereof will be apparent to those skilled in the art to which it pertains, from the following description of the preferred embodiment thereof, described with reference to the accompanying drawings, in which Fig. 1 is a section of an automobile wheel assembly embodying the present invention, taken normal to the axis of rotation thereof with parts of the inflater shown in elevation.

Similar reference characters designate corresponding parts throughout the several views of the drawings.

Figure 4:
Fig. 4 is a section on the line 4—4 of Fig. 3.
Figure 5:
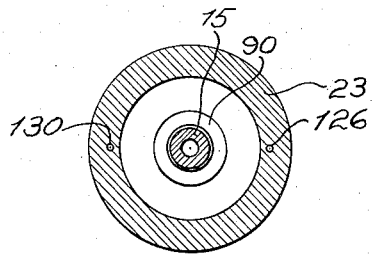
Fig. 5 is a section on the line 5—5 of Fig. 2.
Figure 1:
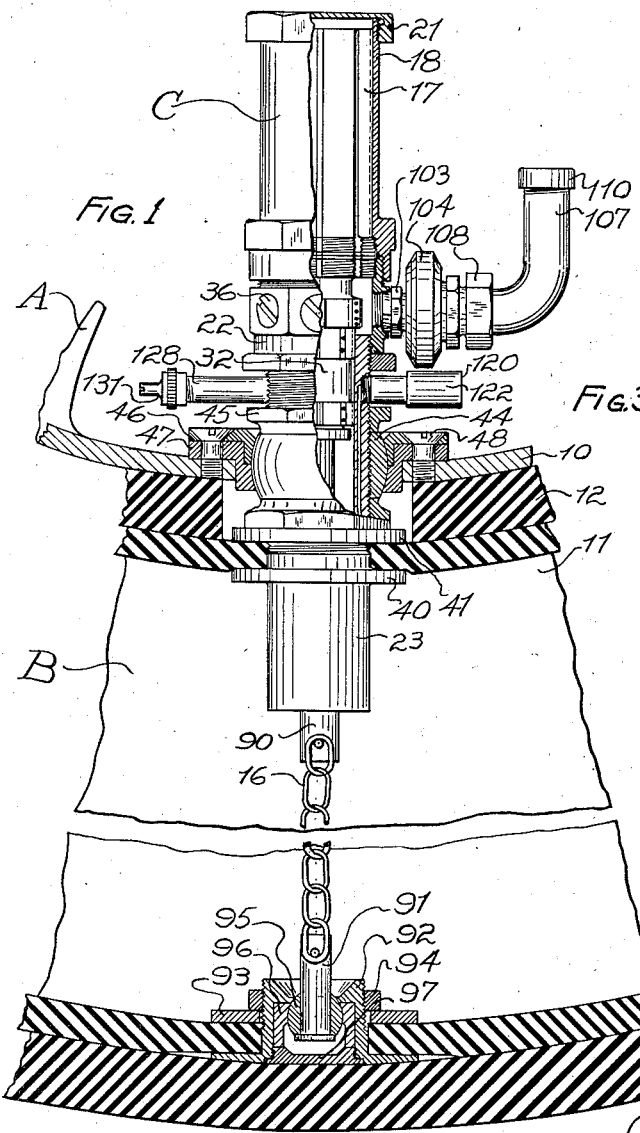
Figure 3:
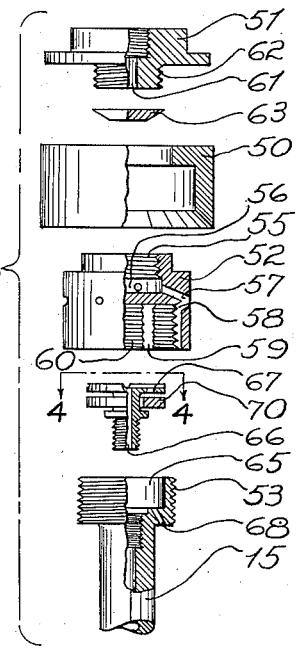
Fig. 3 is an expanded view of part of the piston.

Referring to the drawings, Fig. 1 illustrates a section of an automobile wheel assembly comprising a wheel A, pneumatic tire B and tire inflater C. The wheel A is of conventional construction and comprises a rim 10. The pneumatic tire comprises an inner tube 11, flap 12 and tire casing 13, attached to the rim 10 in any conventional manner. Only that part of the wheel assembly is shown which is necessary to a complete understanding of the present invention. The parts not shown are of conventional construction and will be found in the prior art embodied in a plurality of structures. While it will be readily understood that, in operation, the relative positions of the parts with reference to either the horizontal or vertical is constantly changing, nevertheless throughout the following detailed description of the preferred embodiment of the invention the position of the parts will be referred to as viewed in Figs. 1 and 2 of the drawings.

Briefly stated, the inflater C consists of a tubular housing, hereinafter referred to in general as the inflater housing, swively supported in or connected to the rim 10. Slidably supported within the upper end of the inflater housing is a piston or plunger D attached to the upper end of a tubular piston rod 15, the lower end of which is connected to the outer circumference of the inner tube 11 adjacent the tire tread by a collapsible link connector 16. The piston D is pulled through its compression stroke by the return of the tire to its normal shape as the portion of the tire adjacent the inflater leaves the road surface, and the return stroke of the piston is effected by the action of the air pressure within the tire upon a second piston or plunger E attached to the lower end of the piston rod 15. In the preferred embodiment of the invention shown the two pistons operate to produce a two stage compressor effect.

For the purpose of facilitating manufacture and assembly the inflater housing is made in a plurality of parts. The upper cylinder comprises two tubular members 17 and 18, one within the other, secured together by a threaded connection 19 at the lower end thereof. The inner member 17 has a plurality of longitudinal grooves in the exterior surface thereof which form air passages 20 extending from end to end of the cylinder when the tubular members are assembled. The external tubular member 18 is slightly longer than the inner member 17 and projects to either end thereof. The upper end of the cylinder is closed by a cap member 21 threaded onto the exterior of the member 18, which permits communication between the upper end of the cylinder and the air passages 20. The lower end of the member 18 is slightly enlarged and threaded onto the upper end of a tubular member 22 which, in turn, is threaded onto the upper end of a tubular member 23 which constitutes the lower cylinder. The upper cylinder assembly, comprising the tubular members 17, 18, and 22, is adjustable as a unit longitudinally of the member 23 and is secured in any adjusted position with reference to the member 23 by a jam nut 24. Suitable packing 25 is provided to prevent leakage of air through the threaded connection between the members 22 and 23.

A disc member or cylinder head 27, threaded into the upper end of the member 22, is provided with a central aperture through which the piston rod 15 projects and constitutes the lower cylinder head for the upper cylinder. A plurality of grooves in the circumference of the member 27 form air passages 28 in constant communication with the passages 26 and the interior of the member 22 through the medium of an annular passage 29 formed by clamping the adjacent external edges of the members 17 and 22. Leakage around the piston rod 15 is prevented by suitable packing 30 placed in the bottom of a counterbore in a downwardly projecting boss 31 formed integral with the cylinder head 27. The packing 30 is retained in position within the boss 31 by a packing gland 32, and a gland nut 33 in the form of an elongated tubular member threaded on the exterior of the boss 31. The upper end of the gland nut 33 is enlarged and has a plurality of longitudinal slots 34 formed therein to provide radial fins. The member 22 has a hexagonal section approximately midway between the ends thereof, each face of which is provided with a threaded aperture 35, through which a tool may be inserted for the purpose of rotating the gland nut 33 to take up the packing, etc. When not in use the apertures 35 are closed by plugs 36, one of which is provided with a cylindrical stem 37 adapted to project into one of the slots 35 and prevent rotation of the gland nut during operation of the inflater. Lubrication for the piston rod 15 is supplied by a plurality of felt followers 38, saturated with oil or other lubricant, retained in a counterbore in the lower end of the gland nut 33 by a threaded plug 39.

The member 23, or lower cylinder, projects into the interior of the inner tube 11 through a suitable aperture formed therein, and is secured thereto by clamping a portion of the tube adjacent the aperture between an annular flange 40, formed integral with the member 23 and a washer 41 positioned outside of the tube through the medium of a clamp or jam nut 42, to securely attach the inflater housing to the inner tube. The inflater housing is swivelly supported in or connected to the rim 10 by a ball and socket connection, the ball part of which comprises a tubular member 44 surrounding the member 23, and clamped between the nut 42 and a jam nut 45 threaded on the exterior of the member 23. The exterior surface of the member 44 corresponds to that of a spherical segment and is engaged in a complementary socket formed in two disc members 46 and 47 secured to the rim 10 by screws 48. The construction of the disc members 46 and 47 is such that the member 44 can be readily removed from the socket formed therein.

The upper piston D comprises a suitable leather washer 50 clamped between a disc member 51 and a cylindrical member 52. The member 52 is counterbored and tapped at each end and threaded onto an enlarged upper end 53 of the piston rod 15. The bottom of the upper counterbore 55 is enlarged to provide a valve chamber 56 into which a plurality of air passages 57 open at an upwardly inclined angle from the exterior of the member. The air passages 57 are constantly open to the cylinder below the piston through passages 58 and 59, the latter of which are in the form of grooves in the side wall of the lower counterbore 60. The member 51 which is provided with a longitudinal aperture 61 extending therethrough is secured to the member 50 by a threaded boss 62 on the under side thereof which is threaded into the upper counterbore 55 of the member 52. A feather edged inlet check valve 63, positioned in the valve chamber 56 below the boss 62 is provided for closing the inlet aperture 61 in the member 51 during the compression stroke of the piston D.

A counterbore 65 in the enlarged head 53 of the piston rod 15 is continuously open to the interior of the piston rod 15 through the medium of a longitudinal port 66 in a headed member 67 threaded into the upper end of the piston rod bore. A plurality of exhaust ports 68 in the head 53 communicate between the counterbore 65 and the upper cylinder below the piston or plunger D. The exhaust ports 68 are closed during the intake stroke of the piston by an exhaust check valve 70 in the form of a washer-shaped member freely slidable on the stem of the member 67 below the head thereof. A plurality of holes 71 in the head of the member 67 opening into cross slots 72 eliminates any possibility of the valve 70 sticking and remaining open during the intake stroke. The check valves 63 and 70 are preferably made of synthetic rubber, such as "Duprene" a substance not deteriorated by oil or grease, etc. Lubrication for the upper piston D is provided by a felt follower 75, saturated with oil or other lubricant and secured to the upper side of the disc member 51 by a cap screw 76 and a washer 77. The cap screw 77 has a longitudinal bore 78 through which the inlet port 61 in the member 51 is constantly open to the upper end of the cylinder.

The lower piston E comprises a suitable leather washer 80 clamped between a head member 81 and a flange on a tubular member 82 surrounding the piston rod. Both members 81 and 82 are slidable on the lower end of the piston rod which is reduced to provide a shoulder against which a washer 83, positioned above the member 82, abuts. Lubrication for the lower piston is provided by a felt follower 84, saturated with oil or suitable lubricant, retained between the flange on the member 82 and the washer 83. The parts which comprise the lower piston E are held in their assembled relationship on the piston rod 15 by a jam nut 85 threaded onto the piston rod below the member 81.

As has been previously stated, the lower end of the piston rod 15 is connected to the outer circumference of the inner tube 11 by a flexible collapsible connection 16. The upper end of the flexible connection 16 is attached to a tubular adaptor 90 threaded onto the lower end of the piston rod, and the lower end thereof is attached to a headed member 91, which in turn is connected to a headed member 92 projecting through a suitable aperture in the tube 11 and secured therein by a washer 93 and a jam nut 94 threaded onto the stem inside of the tube. The connection between the headed members 91 and 92 comprises a ball and socket joint, the ball part of which comprises a tubular member 95, the exterior surface of which is that of a spherical segment, supported on the stem of the member 91. The member 95 engages in a complementary bearing surface formed in a bearing member 96 seated in a counterbore in the member 92, closed by a cylindrical plug 97 to make an air-tight connection.

Figure 2:
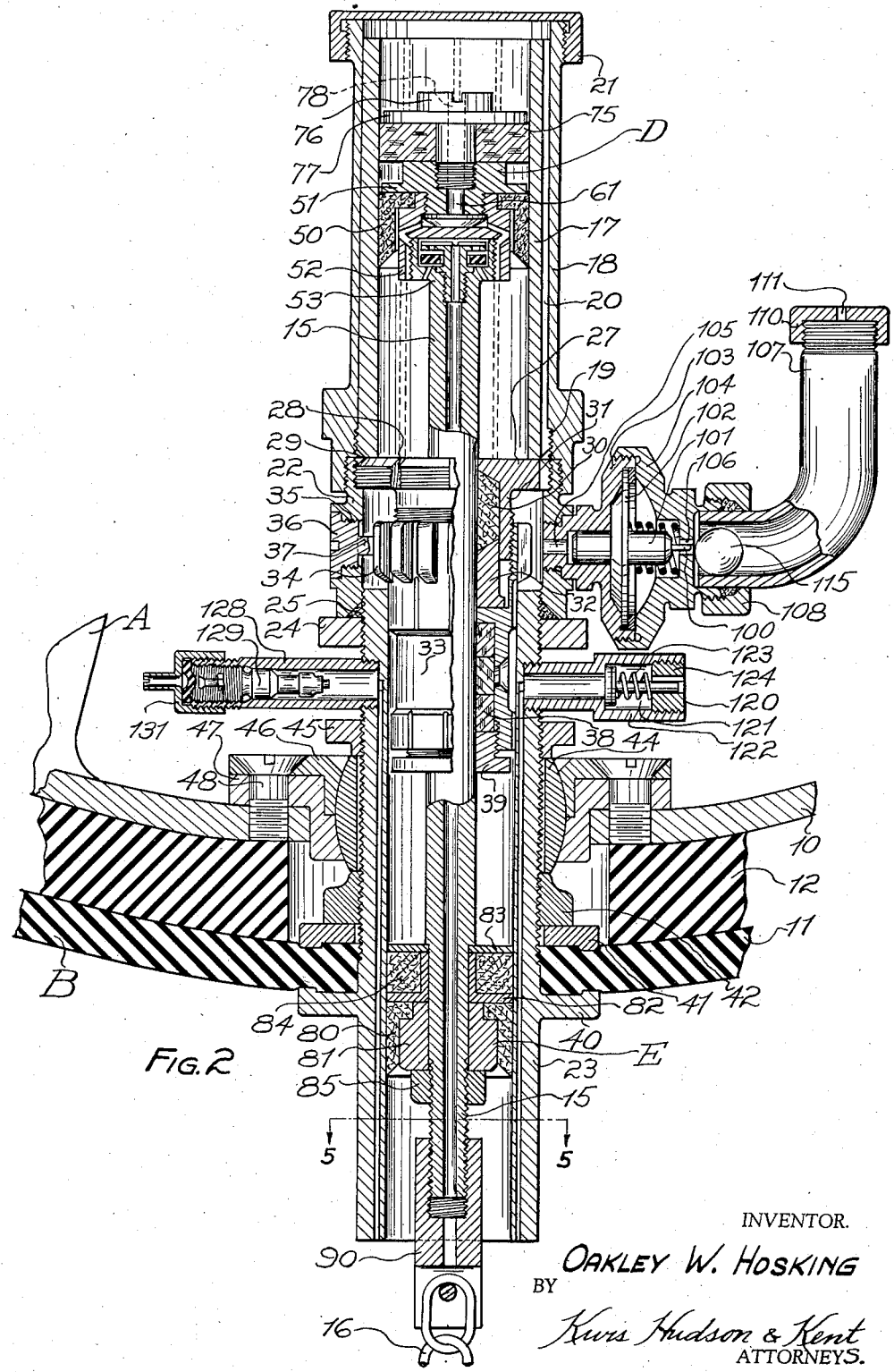
Fig. 2 is an enlarged section of the inflater shown in Fig. 1.

The atmospheric inlet for the inflater comprises a conventional valve insides 100, positioned within a tubular member 101 supported in a diaphragm 102, located within a chamber formed by two members 103 and 104. The member 103 is threaded into one of the apertures 35 in the member 22 and the compartment therein to the left of the diaphragm 102, as viewed in Fig. 2, is continuously open to the interior of the member 22 through an air passage 105. The right hand end of the air passage 105 is counterbored to slidably receive the member 101 and thereby assist the diaphragm in supporting the same in horizontal position. The compartment in the member 104 to the right of the diaphragm 102, is continuously open to the atmosphere through an aperture 106 and an L-shaped piece of tubing 107. The tubing 107 is secured to the member 104 in any convenient manner, as by the nut 108, and is closed at its upper end by a cap 110 provided with an aperture 111. In the event that air pressure accumulates above the pistons, due to leakage about the piston E or the exhaust check valve, as the vehicle stands idle, the diaphragm 102 will be flexed towards the right as viewed in Fig. 2. This movement of the diaphragm projects the stem of the valve insides 100 through the aperture 106 where it is depressed by a ball 115, positioned within the tubular member 107 upon the initial rotation of the wheel A. The weight of the ball 115 is such that the stem of the valve insides 100 will not be depressed by the ball alone, in the event that the wheel should be stopped in such a position that the ball rests thereon, but the weight is such that when supplemented by centrifugal force, due to rotation of the wheel A, or the fall through the tubular member 107 upon the initial rotation of the wheel, the valve will be opened. The construction is such that the ball will fall through the tubular member 107 and strike the stem of the valve insides 100, coincident with the engagement of the tread of the tire adjacent the inflater with the road surface. During the compression stroke of the piston D air is drawn into both cylinders above the pistons through the valve insides 100, and during the return stroke this air is compressed into the space in the upper cylinder below the piston D, with a reduction in volume of about 50%, which operation constitutes the first stage of the compression operation.

To maintain the air pressure in the tire constant and to prevent excessive pressures therein, a safety valve is provided in the form of a plunger valve 120 slidably supported in a counterbore 121 in the outer end of a tubular member 122 threaded into a tapped recess in the lower cylinder member 23. The valve 120 closes the bore in the member 122 and is held in position by a compression spring 123 and a plug 124 threaded into the end of the counterbore. A port 126 in the wall of the member 23 communicates with the bottom of the recess in which the member 122 is threaded and the interior of the tire. The pressure at which the safety valve operates can be adjusted by changing the pressure of the spring 123 through the medium of the plug 124. A second tubular member 128 threaded into a similar recess in the member 23 and provided with a conventional valve insides 129 is provided for initially inflating the tire from a conventional pump connection. A port 130 in the wall of the member 23, similar to the port 126, communicates with the tubular member 128 and the interior of the tire. When not in use the end of the member 128 is preferably closed by a conventional dust cap 131.

It is believed that the operation of the device will be apparent from the foregoing description thereof, suffice it to say that upon each compression stroke the piston D is pulled to the same predetermined position, due to the fact that the tire casing always resumes the same normal shape upon leaving the road surface. Under normal operating conditions it is desired to have the piston D always moved to the end of the cylinder on the compression stroke, and the entire upper cylinder assembly including the member 22 and the cylinder head 27 can be adjusted vertically to effect this result by virtue of the adjustable, or threaded connection between the members 22 and 23. After the parts have been adjusted they are secured in position by the jam nut. Preferably the intake assembly comprising the member 103, etc. is inserted in the aperture 35 nearest the plane of the wheel and the member 22 rotated slightly to bring the assembly into the plane of the wheel if necessary.

From the foregoing description of the preferred embodiment of the invention it will be apparent the objects heretofore enumerated have been attained and that a new and improved inflater for pneumatic tires has been produced. While the invention has been illustrated and described with reference to the preferred embodiment thereof, the same is not limited to the particular construction shown, which may be varied within the scope of this invention. The invention relates to certain novel features and details of construction and combinations and arrangements of parts and this application is intended to cover all variations, adaptations and uses thereof that come within the knowledge and customary practice of those skilled in the art to which it pertains and I particularly point out and claim as my invention the following:

1. In an inflater for pneumatic tires the combination of a reciprocation type compressor adapted to be connected to the radially inner side of the tire, a check valve in the inlet port of said compressor, and a weight for opening said check valve upon rotation of the tire.

2. In an inflater for pneumatic tires the combination of a cylinder adapted to be connected to the radially inner side of the tire, a piston slidably supported within said cylinder adapted to be moved towards one end of said cylinder by the air pressure within the tire, said inflater having an air passage communicating with the last mentioned end of said cylinder, a valve in said air passage, and a weight operatively connected to said valve for opening the same upon rotation of the tire.

3. In an inflater for pneumatic tires the combination of a tubular housing adapted to be connected to the radially inner side of a tire, a partition in said housing forming a plurality of cylinders in tandem relationship, said housing having a common intake air passage communicating with the radially inner end of each cylinder, a valve for closing said intake air passage, and a weight operatively connected to said valve for opening the same.

4. In an inflater for pneumatic tires the combination of a tubular housing adapted to be connected to the radially inner side of a tire, a partition in said housing forming a plurality of cylinders in tandem relationship, said housing having a common intake air passage communicating with the radially inner end of each cylinder, a flexible diaphragm in said air passage, a valve in said diaphragm, and means for opening said valve.

5. In an inflater for pneumatic tires the combination of a tubular housing adapted to be connected to the radially inner side of a tire, a partition in said housing forming a plurality of cylinders in tandem relationship, said housing having a common intake air passage communicating with the radially inner end of each cylinder, a flexible diaphragm in said air passage, a valve having a valve stem for operating the same supported in said diaphragm, a heavy ball in said air passage adapted to strike said valve stem upon rotation of the tire and open said valve, and means for limiting the movement of said ball towards said valve stem.

OAKLEY W. HOSKING.